(12) United States Patent
Frings et al.

(10) Patent No.: US 6,828,411 B2
(45) Date of Patent: Dec. 7, 2004

(54) METHOD OF PRODUCING HIGHLY BRANCHED POLYESTERS WITH UNSATURATED END GROUPS

(75) Inventors: Rainer Bruno Frings, Berlin (DE); Gerwald F. Grahe, Berlin (DE); Ou Shibata, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 73 days.

(21) Appl. No.: 10/370,061

(22) Filed: Feb. 21, 2003

(65) Prior Publication Data

US 2003/0212296 A1 Nov. 13, 2003

(51) Int. Cl.[7] .............................................. C08G 63/52
(52) U.S. Cl. ...................... 528/303; 528/306; 524/714; 524/765; 524/770; 524/802; 524/845
(58) Field of Search .................................. 528/303, 306; 524/714, 765, 770; 514/802, 845

(56) References Cited

U.S. PATENT DOCUMENTS

| | | | | |
|---|---|---|---|---|
| 3,793,057 A | * | 2/1974 | Wheelock | .................... 427/341 |
| 5,087,552 A | * | 2/1992 | Horigome et al. | ....... 430/280.1 |
| 5,629,377 A | * | 5/1997 | Burgert et al. | .............. 524/832 |
| 5,644,010 A | * | 7/1997 | Kurihashi et al. | .......... 526/273 |
| 6,060,557 A | * | 5/2000 | Dahmen et al. | ............ 524/556 |

* cited by examiner

*Primary Examiner*—Samuel A. Acquah
(74) *Attorney, Agent, or Firm*—Armstrong, Kratz, Quintos, Hanson & Brooks, LLP

(57) ABSTRACT

A one-step polymerization process, leading directly to highly branched polyesters with unsaturated, either acrylate or sorbate end groups is described, which is based on the Diels-Alder reaction of polyfunctional sorbic esters with acrylates in defined ratios. A preferred embodiment of the invention is the Diels-Alder polymerization in aqueous emulsion.

12 Claims, No Drawings

METHOD OF PRODUCING HIGHLY BRANCHED POLYESTERS WITH UNSATURATED END GROUPS

BACKGROUND OF THE INVENTION

1. Field of the Invention

The invention relates to a method of producing highly branched polyesters with unsaturated end groups, which are useful in crosslinking systems.

2. Description of Related Art

Starting from the selective development of polymers containing no linear chains or segments but repeatedly branching from a central point out to the periphery of the macromolecule in regular patterns, i.e., what are known as dendrimers, synthetic products have been developed which give rise to highly branched polymers.

Unlike dendrimers, which have to be constructed from low molecular modules, the building principles of which were described by Tomalia et al. in Angew. Chem. Int. Ed., 29, 138 (1990) and Frechet in Science, 263, 1719 (1994) and in the J. Macromol. Sci., Pure Appl. Chem. A31 (11), 1627 (1994), highly branched polymers can be produced more easily and preferably in one- or two-stage reactions although they no longer possess the high regularity of branching in the structure of the macromolecule. Due to the fact that they are principally easier to produce, however, they are of more interest to industry than dendrimers. Dendrimers and "highly branched" polymers are of interest because of certain unique properties which these new classes of polymers have. For example, the viscosities of solutions and melts of these types of polymer are significantly lower than those of linear random coil polymers with similar structural elements and comparable molecular weights because the highly branched macromolecules do not have a coiled conformation in solution or in the melt but a densely packed globular or spherical structure and therefore have a significantly smaller hydrodynamic radius than coiled macromolecules. In theory, therefore, it should not be possible for any entangling to occur between chains of different macromolecules in the melt or in concentrated solutions, which will increase viscosity. The same applies for mixtures of highly branched and linear polymers in solvents, where even a small proportion of highly branched polymers in the polymer mixture can significantly reduce the viscosity of the solution, as C. M. Nunoz et al. were able to demonstrate in Macromolecules, 33, 1720 (2000).

Reactive groups are essentially located at the outer ends of the chain branches, where they are available for other reactions. As the diameter of the macromolecule grows, the number of these groups also increases.

Highly branched polymers can be produced as described by A. Hult et al. in Macromolecules 28, 1698 (1995), for example, and in patent document WO 93/17060 by polycondensing a monomer with a group A and two same groups B or what is known as an $AB_2$-monomer. A 2,2-dimethylol propionic acid is specified as a suitable monomer. According to patent document WO 93/17060, in order to obtain a higher degree of branching, a polyfunctional alcohol such as trimethylol propane or pentaerythritol is firstly condensed with this acid in a molar ratio of 1:3 and the resultant hexafunctional polyol is polycondensed with more 2,2-dimethylol propionic acid. The end groups of this polycondensate are predominantly OH groups.

Other methods are based on polycondensing a polyol with a cyclic anhydride, as described by Ranby and Shi in U.S. Pat. No. 5,834,118 or by polycondensing a dialkanolamine with a cyclic anhydride, as claimed in patent document NL 1008189.

For the purposes of many applications, it is of advantage to introduce reactive end groups other than OH or COOH groups. For example, it appears to be desirable to provide highly branched polymers with unsaturated end groups, such as acrylate or methacrylate groups, for example, in order to take advantage of the properties of this class of polymer to produce compositions which can also be polymerized and crosslinked by radicals, such as UV-curable lacquers and printing inks, fiber-reinforced polyester molded components, stereolithographically produced three-dimensional components or polystyrene with a high impact strength, for example. However, tests conducted by the inventors in an attempt to modify OH terminated highly branched polymers with acrylate and methacrylate end groups demonstrated that it is very difficult to transform the OH end groups with suitable unsaturated reaction partners as desired, because the modification is incomplete and can lead to degradation of the polymer or premature crosslinking.

BRIEF SUMMARY OF THE INVENTION

The underlying objective of the invention is to provide a method of producing highly branched polyesters for use in crosslinking systems, which can be easily conducted on an industrial scale and is generally applicable.

In particular, the method must make it possible to obtain polyesters with unsaturated end groups in a single step, preferably with acrylate end groups, the reaction products having the greatest possible variability in terms of structure, enabling them to be used for different applications.

The objective of the invention is to propose a method of producing a highly branched polyester with unsaturated end groups, comprising polymerizing m-functional sorbic acid esters as component A and n-functional acrylic acid esters as component B in a Diels-Alder reaction at a temperature of from 50 to 150° C., where (i) m and n are whole numbers from 2 to 6 and the difference between m and n is at least 1 and (ii) components A and B are used in a molar ratio which satisfies the following equation (1):

$$n_e/n_v \geq f_v - 1 \tag{1}$$

where $n_e$ is the molar number of the component with the lower functionality, $n_v$ is the molar number of the component with higher functionality and $f_v$ stands for the functionality of the component having a higher functionality.

Consequently, in accordance with the method proposed by the invention, polyfunctional sorbic acid esters (trans-2,5-hexadiene-1-carboxylic acid ester) are transformed with polyfunctional acrylic acid esters in a Diels-Alder reaction to obtain highly branched polyesters with isomeric 4-methylcyclohexene-2-dicarboxylic acid ester groups and unsaturated end groups.

DETAILED DESCRIPTION OF THE INVENTION

In order to produce the highly branched polyesters with unsaturated end groups as proposed by the invention, the component intended to supply the unsaturated end group of the chain branches should have a functionality that is lower than the branching component by a factor of at least one. Accordingly, the component of lower functionality is also referred to hereafter as "the component supplying the end groups" whilst the component with higher functionality is referred to as "the branching component".

Accordingly, if trifunctional sorbic acid esters are transformed with difunctional acrylic acid esters in a Diels-Alder reaction, for example, the result will be highly branched polyesters in which the chain branch ends are essentially terminated with acrylate groups. In the reverse situation, in a reaction with trifunctional acrylic acid esters as the branching component with difunctional sorbic acid esters, for example, the result will be highly branched polyesters in which the chain branch ends are essentially terminated with sorbic acid ester groups.

In order to prevent crosslinking between the polyfunctional sorbic acid and acrylic acid esters during the Diels-Alder reaction, the molar ratio of the two components must satisfy the following equation (1)

$$n_e/n_v \geq f_v - 1 \qquad (1)$$

in which $n_e$ and $n_v$ represent the molar number of the component (e) supplying the end groups and the branching component (v) whilst $f_v$ stands for the functionality of the branching component (v), and in which the functionality $f_e$ of the component (e) supplying the end groups plays no function.

In order to produce highly branched polyesters with acrylate end groups, an at least trifunctional sorbic acid ester is used as the branching component (v) with an at least difunctional acrylic acid ester as component (e) in a molar ratio corresponding to equation 1, in an appropriate solvent, as aqueous emulsion or in the bulk, and heated to temperatures of from 50 to 150° C. until the sorbic acid ester or both starting products are consumed or a desired mean molecular weight is obtained, which can be determined by appropriate analytical methods. Such methods include determining viscosity, gel permeation chromatography, infrared or NMR spectroscopy.

As a result of the Diels-Alder reaction between the sorbic acid ester and the acrylate double bonds, isomeric 4-methyl-cyclo-2-hexene-1,2-, and -1,3-dicarboxylic acid ester groups are produced which form the branching points in the highly branched polyesters and can be expressed by the following formulae, in which R and R' each represent the residues of the multivalent alcohols from which the polyfunctional acrylic acid and sorbic acid esters are derived:

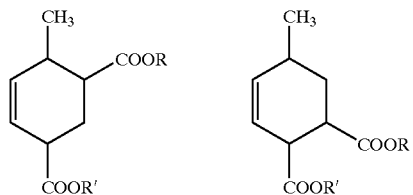

(Each of the dicarboxylic acid esters illustrated above in turn has at least two stereo-isomers and all of these stereo-isomers may be used within the scope of the present invention.)

Higher functional sorbic acid esters may also be made to react with acrylic acid esters having a functionality that is lower than that of the sorbic acid esters by at least one acrylate group. For example, tetrafunctional sorbic acid esters may be transformed with di- or trifunctional acrylic acid esters. This will produce highly branched polyesters with a higher degree of branching and an irregular structure. Undesirable crosslinking between polyfunctional sorbic acid and acrylic acid esters due to the Diels-Alder reaction is prevented if at least the following molar ratios are used:

Trisorbate (v)+Diacrylate (e): $n_e/n_v \geq 2$;
Tetrasorbate (v)+Diacrylate (e): $n_e/n_v \geq 3$;
Tetrasorbate (v)+Triacrylate (e): $n_e/n_v \geq 3$;
Hexasorbate (v)+Diacrylate (e): $n_e/n_v \geq 5$;
Hexasorbate (v)+Triacrylate (e): $n_e/n_v \geq 5$;
Hexasorbate (v)+Tetraacrylate (e): $n_e/n_v \geq 5$.

As expressed in the above formulas, the acrylic acid esters may also be used in molar ratios $n_e/n_v$ higher than $f_v - 1$. However, this results in a reduction of the molecular weights of the highly branched polyesters and an increase in the content of unreacted acrylic acid esters in the polymer mixture. Nevertheless, this approach would not pose a problem for use in many applications, for example in photo-radical crosslinking.

The functionalities and molar ratios between sorbic acid and acrylic acid esters may also be reversed. The reaction of polyfunctional acrylic acid esters with polyfunctional sorbic acid esters, the functionality of which must be lower than that of the acrylic acid ester by at least 1, leads to highly branched polyesters with sorbate end groups based on the molar ratios given above.

For the purposes of the method proposed by the invention, the above-mentioned components A and B, i.e., the component whose unsaturated group forms the end groups of the chain branches and the branching component, in the molar ratios according to equation (1), are heated, either in the bulk, in an appropriate inert solvent or solvent mixture, advantageously under reflux conditions in the presence of 50 to 3000 ppm of at least one radical inhibitor and antioxidants at a temperature of 100 to 150° C., accompanied by stirring under an inert gas such as $N_2$, $CO_2$ or Ar, until the highly branched polyesters have been transformed to the desired degree. This may be controlled by the analytical methods mentioned above.

If using an inert solvent, the content of component A and component B, i.e., diene and dienophile, is 10 to 80% by weight, preferably 30 to 70% by weight. The Diels-Alder reaction between component A and component B may also be conducted in an appropriate pressure reactor as a pressure reaction at pressures of from 1.1 to 100 kbar and temperatures of from 50 to 150° C. under one of the inert gases mentioned above or in an inert solvent or solvent mixture or in the bulk.

Examples of inert solvents suitable for implementing polymerization at normal pressure are aromatic hydrocarbons such as toluene, ethyl benzene, xylene isomers, isopropyl benzene, technical mixtures of aromatic and aliphatic hydrocarbons with boiling ranges corresponding to the polymerization temperatures, ethers with a high boiling point such as diethyleneglycol dimethyl ether, for example, ketones with a high boiling point such as methyl isobutyl ketone, methylamyl ketone or cyclohexanone, for example, or alternatively esters such as n-, iso- and sec-butyl acetate as well as unsaturated monomers which are themselves not capable of undergoing a Diels-Alder reaction with sorbic acid esters, such as styrene, vinyl toluene or methyl methacrylate.

The concentration of the Diels-Alder monomer mixtures in solvent may be varied between 10 and 80% by weight, preferably between 30 and 70% by weight.

If polymerization takes the form of a pressure reaction, it may take place either under the pressure of the inert gas or under the natural pressure of a solvent with a low boiling point used in addition to the solvents used for normal pressure polymerization reactions.

In another especially preferred approach to implementing the invention, the highly branched polyester may also be produced in aqueous emulsion at temperatures of from 60 to 150° C.

The condition for this is that both components A and B must be insoluble in water. Liquid mixtures of polyfunctional sorbic acid and acrylic acid esters with compositions satisfying equation (1) and containing 50 to 3000 ppm of one or more radical inhibitors and antioxidants and purged with an inert gas so as to be free of oxygen, are dispersed at 20 to 50° C. in degassed water containing optionally one or more anionic, cationic or non-ionic emulsifiers in concentrations corresponding at least to their critical micelle concentrations in the aqueous phase, the ratio by volume of monomer/water being between 0.1 and 0.9, preferably between 0.3 and 0.7. The resultant oil-in-water emulsions are heated to temperatures of 60 to 150° C., preferably 80 to 95° C. at normal pressure, whilst stirring and under inert gas until the components have been converted to the highly branched polyesters with unsaturated end groups and the desired distributions of molecular weight. The transformations will take between 6 and 30 hours and will take place more quickly the higher the reaction temperature is. The desired mean molecular weights and molecular weight distributions will depend on both the reaction temperature and the reaction time and increase the higher the temperature and the longer the time. At reaction temperatures in excess of 100° C., polymerization takes place under the natural pressure of the aqueous phase or that of a compressed inert gas within a pressure range of 1.1 to 100 kbar.

When the Diels-Alder polymerization is complete, the resultant highly branched polyester is isolated and purified by simply separating it from the aqueous phase and optionally removing dissolved or emulsified water using a known method such as azeotropic distillation with an carrier or a treatment with a dehydrating agent.

Diels-Alder polymerization in aqueous emulsion may optionally also take place with solutions of the described sorbate/acrylate mixtures in a water-insoluble diluent. Diluents which are suitable for this approach are typical lacquer solvents, for example, such as toluene, xylene, n-, iso- and sec-butyl acetate, methyl isobutyl ketone as well as unsaturated monomers, which themselves are not able to undergo a Diels-Alder reaction with sorbic acid esters, such as styrene, vinyl toluene or methyl methacrylate, which are added to the monomer mixtures in quantities of between 1 and 75% by weight, preferably between 10 and 30%.

The advantages of polymerization in aqueous emulsion are the low polymerization temperature and the simple isolation of the highly branched polyesters, which form a water-insoluble liquid phase after the reaction and can be used immediately after drying using known methods, such as azeotropic water removal with an carrier or treatment with a solid dehydrating agent.

The mean molecular weights of the highly branched polyesters with unsaturated end groups which can be obtained by the method proposed by the invention will depend on the molecular weights of the starting products and the selected reaction conditions. The number averages $M_N$ may be between 1,000 and 50,000 g/mol, preferably between 1,500 and 5,000 g/mol, the distribution ratio $M_W/M_N$ between 1.5 and 20 and even higher as the number averages increase. (Both here and below, $M_N$ stands for the number average molecular weight and $M_W$ for the weight average molecular weight.)

Suitable trifunctional sorbic acid esters for building highly branched polyesters are, for example, glycerol trisorbate, trimethylolethane trisorbate, 2-hydroxymethylbutane-diol-1,4-trisorbate, trimethylolpropane trisorbate, the trisorbates of glycerol-, trimethylolethane- and trimethylolpropane polyethertriols lengthened with variable amounts of ethylene oxide or propylene oxide.

Tetrafunctional sorbic acid esters include, for example, pentaerythritol tetrasorbate and di-trimethylolpropane tetrasorbate and the sorbic acid esters of pentaerythritol and di-trimethylolpropane lengthened with variable amounts of ethylene oxide and propylene oxide.

An example of a hexafunctional sorbic acid ester is di-pentaerythritol hexasorbate.

Difunctional sorbic acid esters are, for example, ethyleneglycol disorbate, di- and tri-ethyleneglycol disorbates and polyethyleneglycol disorbates of various chain lengths, propyleneglycol disorbate, di- and tripropyleneglycol disorbate and polypropyleneglycol disorbate of various chain lengths, butanediol-1,3- and 1,4-disorbates, neopentylglycol disorbate, hexanediol-1,6-disorbate, isosorbide disorbate, 1,4-cyclohexanedimethanol disorbate, disorbate of hydroxymethylated dicyclopentadiene, bisphenol-A-disorbate and the disorbates of bisphenol-A, hydroquinone disorbate, resorcinol lengthened with variable amounts of ethylene oxide and propylene oxide.

The polyfunctional sorbic acid esters needed to form highly branched polyesters, a few examples of which have been named, may be produced using generally known methods, such as esterification of sorbic acid and multivalent alcohols with an acid catalyst and azeotropic removal of the reaction water with an appropriate solvent, by re-esterifying monofunctional sorbic acid esters with multivalent alcohols or by reacting sorbic acid chloride with multivalent alcohols in the presence of an acid-capturing substance.

The polyfunctional acrylates needed to produce polyesters with unsaturated end groups can be obtained by technical means, being large in number and varied in structure:

Examples of suitable diacrylates are ethyleneglycol diacrylate, di- and triethyleneglycol diacrylates and polyethyleneglycol diacrylates of varying chain lengths, propyleneglycol diacrylate, di- and tripropyleneglycol diacrylate and polypropyleneglycol diacrylates of varying chain lengths, butanediol-1,3- and -1,4-diacrylates, neopentylglycol diacrylate, hexanediol-1,6-diacrylate, isosorbide diacrylate, 1,4-cyclohexanedimethanol diacrylate, diacrylate of hydroxymethylated dicyclopentadiene, bisphenol-A-diacrylate and the diacrylates of bisphenol-A, hydroquinone, resorcinol lengthened with ethylene oxide and propylene oxide.

Examples of higher functional acrylic acid esters are glycerol triacrylate, trimethylolethane triacrylate, 2-hydroxyme -thylbutanediol-1,4-triacrylate, trimethylol propane triacrylate and the triacrylates of glycerol-, trimethylolethane- and trimethylolpropane-polyether triols lengthened with ethylene oxide- or propylene oxide.

Tetrafunctional acrylic acid esters are, for example, pentaerythritol tetraacrylate and di-trimethylolpropane tetraacrylate and the acrylates of ethoxylated or propoxylated pentaerythritol and di-trimethylolpropane.

An example of a hexaacrylate is di-pentaerythritol-hexaacrylate. Other suitable polyester acrylates with acrylate end groups are those which may be obtained commercially in various compositions and molecular weights and which can also be obtained through the Diels-Alder reaction of diacrylates with disorbates.

So-called epoxy acrylates, produced by the addition of acrylic acid to aliphatic or aromatic diglycidyl ethers and urethane acrylates, which can be obtained from aliphatic and aromatic diisocyanates and hydroxyalkyl acrylates, may also be used as dienophiles for producing highly branched polyesters, although their OH- or carbamate groups are susceptible to additional reactions under the reaction conditions of Diels-Alder synthesis and the commercial products often constitute mixtures of di- and higher functional acrylates. However, strictly di-, tri- and tetrafunctional products of these types could well serve as dienophiles, if the Diels-Alder reaction is conducted with polyfunctional sorbic acid esters as a pressure reaction in an appropriate solvent at temperatures below 100° C. and pressures between 2 and 100 kbar or in aqueous emulsion below 100° C.

Suitable inhibitors and antioxidants for the polymerization process are, for example, hydroquinone, hydroquinone monomethyl ether, 2,6-di-tert-butyl-4-methyl-phenol, phenothiazine, tris-nonyl phosphite, di-dodecylphenyl phosphite and copper fines or dust.

The highly branched polyesters with unsaturated end groups, after optionally removing the reaction solvent or water, are clear, colorless to pale yellow resins of a low to high viscosity with a number average molecular weights $M_N$ of 1,000 to 50,000 g/mol and polydispersities $M_W/M_N$ of 1.5 to 20, which increase with increasing $M_N$. According to NMR analyses, the end groups on the individual chain branches are largely those associated with the Diels-Alder component having the lower function. Due to the statistical character of the Diels-Alder polymerization, the individual chain branches of the polyester are of differing chain lengths.

The highly branched polyesters with acrylate end groups are more especially preferred and are of practical interest in radical crosslinking systems in a whole range of applications. For example, photoradical-curable lacquers for coating metal, paper and plastic, stereolithographically produced three-dimensional moulds, fiber-reinforced polyester molded components and casting compounds. They may be used either alone in these applications or in a mixture with other mono- and polyfunctional radically polymerizable monomers and as an additive in proportions of 1 to 50% by weight for modifying the usage properties such as the impact and breaking strength of fiber-reinforced, unsaturated polyesters in sheet molding and bulk molding compounds.

Of particular advantage in applications of this type is the ability of the highly branched polyesters significantly to reduce the viscosity of mixtures so that even highly viscous monomers and polymer/monomer mixtures can be used within the respective application specifications. For example, if a solution of 35% by weight of a highly branched polyester, made from trimethylolpropane trisorbate and 1,6-hexanedioldiacrylate, with a $M_n$ of 1,350 g/mol and a $M_W$ of 2,300 g/mol in 20% by weight of 1,6-hexanedioldiacrylate with a viscosity of 0.07 Pa·s/20° C. is added to an epoxy acrylate with a viscosity of 103 Pa·s/20° C., a lacquer mixture is obtained having a viscosity of 4.1 Pa·s/20° C.

This viscosity-reducing effect may be also be found with unsaturated polyester resins, in which a low styrene content of less than 30% by weight is sought whilst simultaneously retaining a viscosity in the range of from 1 to 4 Pa·s/20° C. The unsaturated linear polyester MR-8010 [DAINIPPON INK & CHEMICALS, INC., Tokyo] in a solution with 35% by weight of styrene, for example, has a viscosity of 1.2 Pa·s/20° C. and in solution with 28% by weight of styrene a viscosity of 8.3 Pa·s/20° C. If 35% by weight of styrene, 20% by weight of a highly branched polyester, made from trimethylol propane-trisorbate and dipropyleneglycol diacrylate with a $M_N$ of 2,160 g/mol, a $M_W$ of 18,400 g/mol and a viscosity of 24.5 Pa·s/20° C., is added to the polyester mixture, the styrene content is reduced to 28% by weight and the viscosity to 3.3 Pa·s/20° C. In spite of the significantly higher viscosity of the highly branched polyester, the viscosity of the resultant unsaturated polyester mixture with 28% by weight of styrene is reduced to a value well below that of the linear unsaturated polyester mixture with 28% by weight of styrene. Such mixtures can be cured in the same way as standard unsaturated linear polyester mixtures.

Highly branched polyesters with sorbate end groups obtained by the method of the invention also have viscosity-reducing properties. Due to their diene end groups, they are in a position to undergo other Diels-Alder reactions with dienophiles, such as acrylates, fumarates and maleimides, and to enter into radical crosslinking with other unsaturated bonds.

The technological advantages of polyesters with unsaturated end groups reside in (a) their ease of manufacture, since polymers with unsaturated end groups are obtained in one step, (b) their viscosity-reducing effect, which makes them of practical interest as polymeric reactive thinners in many applications, (c) their high functionality at a simultaneously high equivalent weight per unsaturated end group, which leads to high reactivity whilst simultaneously reducing volume shrinkage and (d) the possibility of adjusting the chain structure and the degree of branching of highly branched polyesters by a judicious selection of reaction partners and their functionality, thereby enabling different polymers to be obtained for numerous different applications, for which purpose polyfunctional acrylates in particular can be technically obtained in a large variety of structures and in functionalities of between 2 and 6.

Synthesis and applications of the polyesters proposed by the invention are demonstrated by the examples set out below.

EXAMPLE 1

10.4 g (0,025 mol) trimethylolpropane trisorbate, 12.7 g (0,056 mol) hexanediol-1,6-diacrylate (HDDA), 0.05 g phenothiazine, 0.015 g tris-(nonylphenyl)-phosphite and 0.029 g 2,6-di-tert-butyl-4-methyl-phenol (BHT) were weighed into a 100 ml round-bottomed flask with magnetic stirrers, thoroughly mixed and purged with $N_2$ so as to be oxygen-free. The reaction mixture was stirred under $N_2$ on an oil bath for 2 h at 138° C. After cooling, a resin with a low viscosity was obtained. Gel chromatography (GPC) in THF measured by the polystyrene standard showed the following molecular weights: $M_N$=1,380 and $M_W$=2,300 g/mol. The resin still contained 14% HDDA.

EXAMPLE 2

8.3 g (0.02 mol) trimethylolpropane trisorbate, 12.7 g (0.056 mol) dipropyleneglycol diacrylate (DPGDA), 0.05 g phenothiazine, 0.015 g tris-(nonylphenyl)-phosphite, 0.037 g (BHT) and 3.7 g hexyl benzene for the quantitative GPC analysis were weighed into a into a 100 ml round-bottomed flask with magnetic stirrers, thoroughly mixed and purged with $N_2$ so as to be oxygen-free. The reaction mixture was stirred under $N_2$ on an oil bath for 10 h at 138° C. After 1, 3.5, 8 and 10 hours, samples were taken and analyzed by GPC and calibrated with hexyl benzene. The following results were obtained:

| after 1 h: | $M_N$ = 940 g/mol, | $M_W$ = 1,280 g/mol, | residual monomers: 53% |
|---|---|---|---|
| after 3.5 h: | $M_N$ = 1,450 g/mol, | $M_W$ = 4,140 g/mol, | residual monomers: 35% |
| after 8 h: | $M_N$ = 2,780 g/mol, | $M_W$ = 9,200 g/mol, | residual monomers: 11% |
| after 10 h: | $M_N$ = 3,560 g/mol, | $M_W$ = 16,900 g/mol, | residual monomers: 6% |

EXAMPLE 3

In a 100 ml round-bottomed flask with magnetic stirrers, 8.3 g (0.02 mol) trimethylolpropane trisorbate, 10.9 g (0.045 mol) DPGDA, 0.019 g phenothiazine and 0.019 g BHT were dissolved in 20 ml techn. xylene, purged with $N_2$ and heated under $N_2$ for 6.5 h to an internal temperature of 140–142° C. whilst stirring.

After cooling, the xylene was distilled off from the water bath at 10 mbar vacuum. The residual resin had the following molecular weights: $M_N$=2,150 g/mol, $M_W$=18,400 g/mol; residual DPGDA=8%.

EXAMPLE 4

In a 100 ml round-bottomed flask with magnetic stirrers, 14.6 g (0.02 mol) trisorbate of ethoxylated (2.5 EO/OH) trimethylol propane (TMP-(EO)$_{2.5}$-TS), 10.9 g (0.045 mol) DPGDA, 0.025 g phenothiazine and 0.025 g BHT were dissolved in 25 ml techn. xylene, purged with $N_2$ and heated under $N_2$ for 6.5 h at an internal temperature of 142° C. whilst stirring. After cooling, the xylene is distilled off from the water bath at 10 mbar vacuum. The residual resin had the following molecular weights: $M_N$=1,800 g/mol, $M_W$=13,000 g/mol; residual DPGDA=10%. The viscosity, measured with an ICI cone/plate viscometer, was 3.2 Pa·s (25° C.).

EXAMPLE 5

80 ml $H_2O$ and 0.090 g Na-dodecylsulfate (NaDS) were placed in a 250 ml three-necked flask with magnetic stirrers, internal thermometer, gas intake pipe and reflux cooler, and the flask evacuated with a diaphragm pump and purged with $N_2$ twice. A mixture of 20 g (0.028 mol) TMP-(EO)$_{2.5}$-TS and 15 g (0.062 mol) DPGDA purged with $N_2$ was stirred into the water phase within 15 minutes and the emulsion heated to 93° C. on an oil bath. 1.5 hours after reaching the reaction temperature, a sample was taken for GPC and produced the following values: $M_N$=1,200 g/mol, $M_W$=1,400 g/mol, residual DPGDA=16%. The test batch was then stirred for a further 17 h at 93° C. Phase separation occurred after halting the stirring and during cooling. The bottom organic phase was dissolved in acetone, dried on $Na_2SO_4$ and the auxiliary solvent distilled off under vacuum. The resultant polymer yield was 80%. The following values were found: $M_N$=1,900 g/mol, $M_W$=3,200 g/mol, residual DPGDA=9%, viscosity: 1.5 Pa·s (25° C.).

EXAMPLE 6

The monomer mixture of example 5 was polymerized for 30 h in emulsion under reaction conditions that were otherwise the same. The following values were determined from the isolated resin: $M_N$=2,500 g/mol, $M_W$=13,200 g/mol, residual DPGDA=6%, Viscosity: 17.3 Pa·s (25° C.)

EXAMPLE 7

A 3 l flat flange reactor fitted with an anchor stirrer, contact thermometer, gas inlet pipe and reflux cooler was filled with 1650 ml $H_2O$, in which 1.9 g NaDS were dissolved, alternately evacuated with a diaphragm pump and filled with $N_2$ three times. A mixture of 412.7 g (0.564 mol) TMP-(EO)$_{2.5}$-TS and 307 g (1.268 mol) DPGDA purged with $N_2$ was then stirred into the aqueous phase for 30 minutes and heated within 1.5 hours with an oil bath to 89–90° C. and stirred at this temperature for 18.5 hours. The mixture was then cooled, two phases forming once the stirrer was stopped. The emulsified water was removed from the bottom, cloudy, organic phase on the rotary evaporator at 30 mbar by distillation until the resin was clear. The yield of liquid polymer was 663.6 g=92% of the theoretical yield. The following values were determined: $M_N$=1,640 g/mol, $M_W$=13,000 g/mol, residual DPGDA =11%, viscosity: 1.28 Pa·s (25° C.).

EXAMPLE 8

A 2 l flat flange reactor fitted with an anchor stirrer, contact thermometer, gas inlet pipe and reflux cooler was filled with 800 ml $H_2O$, in which 0.86 g NaDS were dissolved, alternately evacuated with a diaphragm pump and filled with $N_2$ three times. A mixture of 146 g (0.2 mol) TMP-(EO)$_{2.5}$-TS and 191 g (0.45 mol) ethoxylated bisphenol-A-diacrylate (BPEODA) purged with $N_2$ was then stirred into the aqueous phase within 30 minutes and heated within 1 hour with an oil bath to an internal temperature of 90–93° C., stirred at this temperature for 17 hours and a sample taken for GPC. The following values were determined: $M_N$=2,350 g/mol, $M_W$=3,800 g/mol, residual BPEODA=24%, viscosity: 17.3 Pa·s (25° C.). The reaction was continued for a further 23 hours at 93° C. The emulsion was then cooled, two phases being formed once the stirrer was stopped. The highly viscous bottom phase was dissolved in 500 ml of acetone, dried on $Na_2SO_4$ and the acetate finally distilled off with a diaphragm pump. Yield: 302 g=90% of the theoretical yield. The following values were determined: $M_N$4,200 g/mol, $M_W$=12,000 g/mol, residual BPEODA=17%, viscosity: 146 Pa·s (25° C.).

EXAMPLE 9

300 ml $H_2O$ and 0.370 g Na-dodecyl sulfate (NaDS) were placed in a 1 l three-necked flask with magnetic stirrers, internal thermometer, gas inlet pipe and reflux cooler and the flask was evacuated with a diaphragm pump and filled with $N_2$ twice. A mixture of 146.4 g (0.20 mol) TMP-(EO)$_{2.5}$-TS and 135.8 g (0.60 mol) HDDA and 0.140 g BHT purged with $N_2$ were then stirred into the aqueous phase within 15 minutes, the emulsion heated on an oil bath to 93° C. and stirred for 21.5 hours. The mixture was then cooled, two phases forming when the stirrer was switched off. The bottom, cloudy, organic phase was diluted with 300 ml of toluene and the water contained in the resin azeotropically removed. The yield of toluene-free resin was 266.9 g=95% of the theoretical yield. The following values were determined: $M_N$=2,100 g/mol, $M_W$=10,100 g/mol, residual HDDA=20%, viscosity: 0.83 Pa·s (25° C.).

EXAMPLE 10

130 ml $H_2O$ and 0.146 g Na-dodecyl sulfate (NaDS) were placed in a 500 l three-necked flask with magnetic stirrers, internal thermometer, gas inlet pipe and reflux cooler and the flask was evacuated with a diaphragm pump and purged with $N_2$ twice. A mixture of 29.5 g (0.05 mol)) trisorbate of propoxylated(1 PO/OH) trimethylol propane (TMP-(PO)-TS) and 27.2 g (0.113 mol) DPGDA purged with $N_2$ were then stirred into the water phase within 15 minutes, the emulsion heated on an oil bath to 90° C. and stirred for 9.5 hours. The mixture was then cooled, two phases forming once the stirrer was switched off. The bottom, cloudy, organic phase was dissolved in 200 ml of acetone, dried over $Na_2SO_4$ and the solvent was then distilled off again in diaphragm pump vacuum. Yield: 50.3 g thin liquid resin= 89% of the theoretical yield. The following values were determined: $M_N$=1,100 g/mol, $M_W$=8,200 g/mol, residual DPGDA=20%.

EXAMPLE 11

500 ml $H_2O$ and 0.59 g NaDS were placed in a 1 l three-necked flask with blade stirrers, internal thermometer, gas inlet pipe and the flask was evacuated with a diaphragm pump and purged with $N_2$ twice. A mixture of 100 g (0.155 mol) tetrasorbate of ethoxylated (0.75 EO/OH) pentaerythritol (penta-$(EO)_{0.75}$-TS) and 122 g (0.5 mol) DPGDA and 0.22 g BHT purged with $N_2$ were then stirred into the water phase within 25 minutes, the emulsion heated on an oil bath to 93° C. and stirred for 17 hours. The mixture was then cooled, separated into two phases and the water distilled off from the cloudy, organic phase under diaphragm pump vacuum. Yield: 187 g=84% of the theoretical yield. The following values were determined: $M_N$=1,700 g/mol, $M_W$=3,300 g/mol, residual DPGDA=14%.

EXAMPLE 12

60 ml $H_2O$ and 0.075 g NaDS were placed in a 100 ml round-bottomed flask with a magnetic stirrer and internal thermometer and the flask evacuated with a diaphragm pump and purged with $N_2$ twice. A mixture of 10 g (0.016 mol) penta-$(EO)_{0.75}$-TS and 18.3 g (0.062 mol) trimethylol propane triacrylate (TMPTA) and 0.03 g BHT purged with $N_2$ was then stirred into the water phase within 15 minutes, the emulsion heated on an oil bath to 94° C. and stirred for 19 hours. The mixture was then cooled, the phases separated and the water removed from the cloudy organic phase by distillation under diaphragm pump vacuum. Yield: 23.3 g=82% of the theoretical yield. The following values were determined: $M_N$=3,800 g/mol, $M_W$=48,200 g/mol, residual TMPTA=19%, viscosity: 287 Pa·s (25° C.)

EXAMPLE 13

75 ml $H_2O$ and 0.075 g NaDS were placed in a 250 ml round-bottomed flask with a magnetic stirrer and internal thermometer and the flask evacuated with a diaphragm pump and purged with $N_2$ twice. A mixture of 10 g (0.016 mol) penta-$(EO)_{0.75}$-TS and 18.3 g (0.062 mol) trimethylol propane triacrylate (TMPTA), 7 g styrene (=20% by reference to monomers) and 0.03 g BHT purged with $N_2$ was then stirred into the water phase within 15 minutes, the emulsion heated on an oil bath to 94° C. and stirred for 19.5 hours. The mixture was then cooled, the phases separated and the water removed from the cloudy organic phase by distillation under diaphragm pump vacuum. Yield: 32.3 g=92% of the theoretical value. The following values were determined: $M_N$=1,800 g/mol, $M_W$=4,400 g/mol, residual TMPTA+styrene= 25%, viscosity: 2.87 Pa·s (25° C.).

EXAMPLE 14

50 ml $H_2O$ and 0.054 g NaDS were placed in a 100 ml round-bottomed flask with a magnetic stirrer and internal thermometer and the flask evacuated with the diaphragm pump and purged with $N_2$ twice. A mixture of 5.9 g (0.02 mol) trimethylol propane triacrylate, 14.5 g (0.045 mol) dipropylene glycol disorbate (DPGDS), 0.02 g BHT and 0.02 g phenothiazine purged with $N_2$ was then stirred for 15 minutes, the resultant emulsion heated on an oil bath to an internal temperature of 90° C. within 35 minutes and stirred at this temperature for 17.5 hours. The mixture was then cooled, the phases separated and the water removed from the cloudy organic phase by distillation under diaphragm pump vacuum. Yield: 18.5 g liquid resin=91% of the theoretical value. The following values were determined: $M_N$=1,300 g/mol, $M_W$=7,200 g/mol, residual TMPTA+DPGDS=25%.

EXAMPLE 15

40 ml $H_2O$ and 0.046 g NaDS were placed in a 100 ml round-bottomed flask with a magnetic stirrer and internal thermometer and the flask evacuated with a diaphragm pump and purged with $N_2$ twice. A mixture of 4.7 g (0.01 mol) di-trimethylol propane tetraacrylate (DTMPTA), 12.9 g (0.040 mol) dipropylene glycol disorbate (DPGDS), 0.02 g BHT and 0.02 g phenothiazine purged with $N_2$ was then stirred for 5 min, the resultant emulsion heated within 30 minutes on the oil bath to an internal temperature of 90° C. and stirred at this temperature for 17.5 hours. The mixture was then cooled, the phases separated and the water removed from the cloudy organic phase by distillation under diaphragm pump vacuum. Yield: 15.2 g=87% of the theoretical value. The following values were determined: $M_N$=1,630 g/mol, $M_W$ 8,750 g/mol; residue: DPGDS+ DTMPTA=31%.

EXAMPLE 16

Placed in three 250 ml three-necked flasks with a magnetic stirrer, internal thermometer, gas inlet pipe and reflux cooler for every 40 ml $H_2O$ were a.) 0.046 g pluronic-L61™ (liquid poly-(ethylene oxide-propylene oxide)-block copolymer
b.) 0.048 g AEROSOL-A22™ N-(1,2-dicarboxyethyl)-N-octadecyl-sulfosuccinamate tetra sodium salt (35% in $H_2O$)
c.) no emulsifier
and the flask was evacuated with the diaphragm pump and purged with $N_2$ twice. A mixture of respectively 10 g (0.014 mol) TMP-$(EO)_{2.5}$-TS and 7.5 g (0.031 mol) DPGDA and 0.017 g BHT purged with $N_2$ was placed in each flask, stirred into the water phase within 15 minutes, the emulsions heated on an oil bath to 93° C. and stirred at this temperature for 17 h respectively. After the reaction, the phases were separated and the water removed from the organic phase by distillation. The yields of polymer were: a.) 16.1 g, b.) 16.4 g and c.) 16.0 g. The GPC measurements then gave the following molecular weights and residual DPGDA contents:
a.) $M_N$=1,560 g/mol, $M_W$=5,300 g/mol; residual DPGDA: 11%
b.) $M_N$=1,600 g/mol, $M_W$=3,700 g/mol; residual DPGDA: 10%
C.) $M_N$=1,510 g/mol, $M_W$=4,900 g/mol; residual DPGDA: 11%

EXAMPLE 17

230 ml $H_2O$ were placed in a 500 ml three-necked flask fitted with a blade stirrer, reflux cooler and internal thermometer and the flask evacuated with a diaphragm pump and purged with $N_2$ twice. A mixture of 35 g (0.054 mol) penta-$(EO)_{0.75}$-TS and 72 g (0.217 mol) Laromer-8765™ (epoxy acrylate of butane diol-1,4-diglycidyl-ether and two acrylic acid equivalents) and 0.05 g phenothiazine purged with $N_2$ were dropped into the water phase within 20 minutes, the emulsion heated on an oil bath to 94° C. and stirred for 18.5 h. On cooling, there was a separation into two cloudy phases. The organic phase was filtered on diatomaceous earth, whereupon the resin became clear. Yield 84 g=79% of the theoretical value. The following values were determined: $M_N$=3,400 g/mol, $M_W$=7,300 g/mol, residual acrylate=20%, viscosity: 10.2 Pa·s (25° C.)

What is claimed is:

1. Method of producing a highly branched polyester with unsaturated end groups, comprising polymerizing an m-functional sorbic acid ester for component A and an n-functional acrylic acid ester for component B in a Diels-Alder reaction at a temperature of from 50 to 150° C., wherein
   (i) m and n are natural whole numbers from 2 to 6 and m differs from n by at least 1 and
   (ii) components A and B are used in a molar ratio satisfying the following equation (1):

$$n_e/n_v \geq f_v - 1 \quad (1)$$

wherein $n_e$ is the molar number of the component having a lower functionality, $n_v$ is the molar number of the component having a higher functionality and $f_v$ represents the functionality of the component with the higher functionality.

2. Method as claimed in claim 1, wherein m stands for 3 to 6 and n for 2 to 4.

3. Method as claimed in claim 1, wherein m stands for 2 to 4 and n for 3 to 6.

4. Method as claimed in claim 1, wherein the reaction takes place in a solvent in the presence of 50 to 3000 ppm of at least one radical inhibitor at normal pressure and the solvent is removed after the reaction at a temperature of from 100 to 150° C.

5. Method as claimed in claim 1, wherein the reaction takes place without solvent at a temperature of from 100 to 150° C. in the presence of 50 to 3000 ppm of at least one radical inhibitor.

6. Method as claimed in claim 1, wherein the reaction takes place at a pressure of 1.1 to 100 kbar and a temperature of 50 to 150° C. under an inert gas atmosphere.

7. Method as claimed in claim 1, wherein water-insoluble components A and B are used and the reaction takes place in aqueous emulsion at a temperature of from 60 to 150° C. in the presence of 300 to 3000 ppm of at least one radical inhibitor and optionally an emulsifier, whereby the concentration of the optionally used emulsifier must correspond at least to its critical micelle concentration.

8. Method as claimed in claim 7, wherein the water-soluble components A and B are used and that the reaction takes place at normal pressure at a temperature between 80 and 95° C. in the presence of 300 to 3000 ppm of at least one radical inhibitor and optionally an emulsifier, whereby the concentration of the optionally used emulsifier must correspond at least to its critical micelle concentration.

9. Method as claimed in claim 7, wherein the water-soluble components A and B are used and that the reaction takes place at a pressure of 1.1 to 100 kbar of an inert gas at a temperature between 50 and 150° C. in the presence of 300 to 3000 ppm of at least one radical inhibitor and optionally an emulsifier, whereby the concentration of the optionally used emulsifier must correspond at least to its critical micelle concentration.

10. Method as claimed in claim 7, wherein the water-soluble components A and B are used in 1 to 75 weight-% of a water-insoluble diluent and that the reaction takes place at normal pressure at a temperature between 80 and 95° C. in the presence of 300 to 3000 ppm of at least one radical inhibitor and optionally an emulsifier, whereby the concentration of the optionally used emulsifier must correspond at least to its critical micelle concentration.

11. Method as claimed in claim 7, wherein the water-soluble components A and B are used in 1 to 75 weight-% of a water-insoluble diluent used and that the reaction takes place at a pressure of 1.1 to 100 kbar of an inert gas at a temperature between 50 and 150° C. in the presence of 300 to 3000 ppm of at least one radical inhibitor and optionally an emulsifier, whereby the concentration of the optionally used emulsifier must correspond at least to its critical micelle concentration.

12. A highly branched polyester with unsaturated end groups obtained by the method as claimed in claim 1.

* * * * *

UNITED STATES PATENT AND TRADEMARK OFFICE
CERTIFICATE OF CORRECTION

PATENT NO. : 6,828,411 B2
DATED : December 7, 2004
INVENTOR(S) : Frings et al.

It is certified that error appears in the above-identified patent and that said Letters Patent is hereby corrected as shown below:

<u>Title page,</u>
Insert -- [30] Foreign Application Priority Data
          Feb. 25, 2002    (EP) ............... 02003299.1 --

Signed and Sealed this

Seventeenth Day of May, 2005

JON W. DUDAS
*Director of the United States Patent and Trademark Office*